United States Patent
Dietrich et al.

(10) Patent No.: US 10,523,116 B2
(45) Date of Patent: Dec. 31, 2019

(54) TIMER FOR CREATING A STABLE ON TIME

(71) Applicant: Texas Instruments Incorporated, Dallas, TX (US)

(72) Inventors: Stefan Dietrich, Freising (DE); Joerg Kirchner, Mauern (DE); Ruediger Ganz, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/126,705

(22) Filed: Sep. 10, 2018

(65) Prior Publication Data

US 2019/0305676 A1    Oct. 3, 2019

Related U.S. Application Data

(60) Provisional application No. 62/650,765, filed on Mar. 30, 2018.

(51) Int. Cl.
*H02M 3/137* (2006.01)
*G06F 1/04* (2006.01)
*H02M 3/158* (2006.01)

(52) U.S. Cl.
CPC ............... *H02M 3/137* (2013.01); *G06F 1/04* (2013.01); *H02M 3/1582* (2013.01)

(58) Field of Classification Search
CPC ........ H02M 3/137; H02M 3/1582; G06F 1/04
See application file for complete search history.

(56) References Cited

U.S. PATENT DOCUMENTS 8,773,084 B2   7/2014   Casey et al.
9,787,185 B2   10/2017  Lo Iacono et al.

2006/0082394 A1 *   4/2006   Briskin ............... H03K 5/13
327/77
2014/0375285 A1 *   12/2014  Chen ................. H02M 3/158
323/271
2017/0264195 A1     9/2017   Li

FOREIGN PATENT DOCUMENTS

CN   101459381 A    6/2009
DE   102016105358 A1  10/2016

OTHER PUBLICATIONS

Search Report for PCT Application No. PCT/US19/24499, Date of mailing of the international search report dated Aug. 8, 2019 (1 page).
CN101459381A, Machine Translation, 16 pages.
DE102016105358A1, Machine Translation, 19 pages.

* cited by examiner

*Primary Examiner* — Daniel C Puentes
(74) *Attorney, Agent, or Firm* — Tuenlap Chan; Charles A. Brill; Frank D. Cimino (57) ABSTRACT

A timer for creating a stable on time. The timer may have a reference voltage source, and an input voltage source. The voltage sources providing voltage that can be applied to a various circuit components such as capacitors, inductors, resistors, diodes, transistors, or other components. The reference voltage source may also be modified by a set of transistors coupled as a diode before being seen by an input of a timer comparator. The reference and input voltage source signals, which may be modified by circuit components, are compared by the timer comparator and then output as a timer control signal. The timer control signal may control a voltage converter, or the switches of a voltage converter.

13 Claims, 6 Drawing Sheets

FIG. 9

TIMER FOR CREATING A STABLE ON TIME

CROSS-REFERENCE TO RELATED APPLICATIONS

This application claims the benefit of U.S. Provisional Application No. 62/650,765, filed Mar. 30, 2018, the disclosure of which is incorporated herein by reference.

BACKGROUND

In boost converters there is a problem in creating a stable time on signal. Boost converters have a boost mode wherein $V_{out}$ is boosted to a value great than $V_{in}$. However, during down mode operations of boost converters, $V_{out}$, can be less than $V_{in}$, resulting in a condition where $V_{in}$ and $V_{max}$ are equal causing a comparison to result in a zero or null signal and causing a control error for any coupled switches. To overcome this issue, a fixed time on is generated to reconstruct the down-mode on-time. This fixed on-time can be generated by a hardwired RC network with a fixed propagation time. However, these hardwired RC networks lack accurate timing, and do not have a stable frequency and can react to variations in the load or thermal properties of the circuit or load. Thus, these hardwired or fixed frequency timers can result in a frequency runaway that will not control or operate a boost converter.

SUMMARY

The present disclosure provides a timer that can be coupled to voltage or current converters. The timer may include, various circuit elements, including but not limited to transistors, diodes, resistors, capacitors, amplifiers, comparators, logic chips, or inductors.

In one aspect, the present disclosure can be directed to a timer coupled to a boost converter. The timer can react to the variations in the boost circuit by compensating for the properties of the circuit elements of the boost converter. These elements can have thermal, as well as, load dependent properties.

In another aspect, the present disclosure may be directed to a timer that provides for a fixed or quasi-fixed frequency that will allow the timer to generate control signals. A voltage converter can then utilize these control signals.

BRIEF DESCRIPTION OF THE DRAWINGS

The novel features believed characteristic of the present disclosure are set forth in the appended claims. The present disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
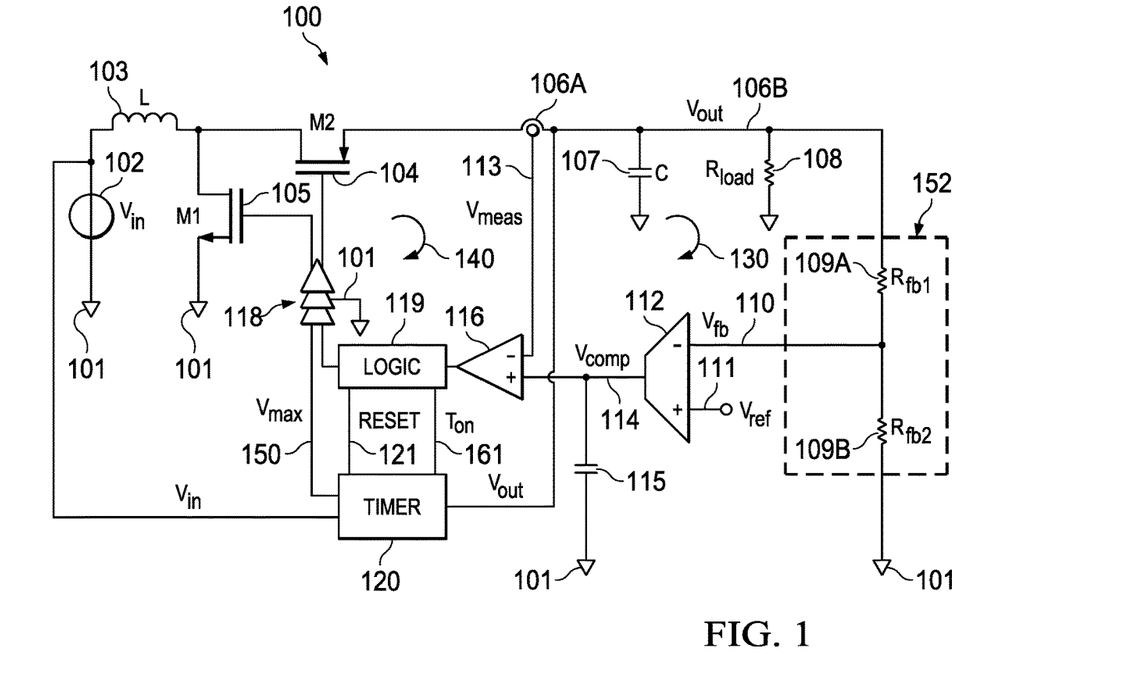
FIG. 1 illustrates a schematic of a current-controlled DC-DC boost converter.

The schematic of a current controlled DC-DC boost converter 100 is shown in FIG. 1. The converter can be identified by two control loops 130, 140. The outer control loop 130 can be a voltage loop, which consists of the resistive feedback divider, and/or voltage divider, and the gm stage (or trans-conductive amplifier stage or gain stage) where an output may be the low-bandwidth signal $V_{comp}$. The purpose of the outer control loop 130 can be to control the voltage variations of the converter 100. The inner current loop 140 can control the current variations of the converter 100. The inner current loop 140 includes an ideal current measurement component and its information $V_{meas}$ can be compared with the output of the voltage control loop $V_{comp}$ at the main current comparator 116 to generate the on signals of the two transistors, or control switch 105 and control switch 104. With this method, the boost converter output voltage and current are controlled with the two loops 130, 140 to keep the boost converter in a stable steady-state operation.

The input voltage source ($V_{in}$) 102 may be the initial voltage source for the boost converter 100, but in examples, there may be more than one input voltage source. For example, there may be multiple batteries placed in series or in parallel that may provide an input voltage. The input voltage source 102 can be followed by an inductor 103, the inductor can supply some, if not all, of the energy storage for conversion by the boost converter 100. In one example, the input voltage source 102 may be coupled to a timer 120 or logic block. The inductor 103 can be coupled to two switches 105, and 104 that allows for the control of the boost converter operation. The voltage node 106A and/or 106B (collectively 106) following the switches can carry the output voltage ($V_{out}$) of the switches and the voltage seen by the load or $V_{load}$. In at least one version $V_{out}$ and $V_{load}$ are equal or carried on the same node, while in other alternative examples additional circuit elements, such as, diodes, resistors, capacitors, inductors, or transistors may also be present between the $V_{out}$ and $V_{load}$ carrying nodes.

Connected to the voltage node 106A and/or 106B can be a smoothing capacitor 107 and/or the load resistance ($R_{load}$) 108. The voltage node 106A may be coupled directly through a measurement device, or through an indirect coupling such as, a sensing device to a comparator 116. In one embodiment of the present disclosure, a current could be sensed at voltage node 106A. The sensed current in other examples may also be converted to a voltage by circuit components before being coupled to comparator 116. However, the voltage nodes 106A and 106B may also be directly coupled and may be considered as the same node. The smoothing capacitor allows for a balancing of the voltage supplied by the switches 104 and 105. A voltage divider includes two serially connected resistors 109A and 109B. The resistor 109A has a first resistance Rfb1, and the resistor 109B has a second resistance Rfb2. In one example, if there is a fixed value for the desired output voltage, then a fixed resistance or set of resistance can be utilized. In another example, when an output voltage may be chosen from multiple values, a trimmable resistor or potentiometer can be utilized for one, or both resistors 109A and 109B.

The voltage divider 152 provides the feedback voltage ($V_{fb}$) 110 that can be fed into a first input of an amplifier 112. In one implementation, the amplifier 112 can be an error amplifier. A second input into the amplifier 112 can be a reference voltage ($V_{ref}$) 111. The reference voltage 111 can also be to an input voltage or a maximum voltage ($V_{max}$). A frequency compensation capacitor 115 at the node $V_{comp}$ 114 is used to ensure control loop stability of the outer voltage control loop before being fed into a first input of a comparator 116. In other examples, the comparator 116 can be a current comparator that compares the sensed current from the node 106A and the current output from the amplifier 112. The comparator could also include or be interchanged with, voltage comparators, current comparators, op-amps, amplifiers, trans-conductance amplifiers, logic circuits, or combinations thereof.

The comparator 116 can have at least two inputs (a positive or non-inverting input, and a negative or inverting input), and can compare the measured voltage ($V_{meas}$) 113, as well as the comparison voltage ($V_{comp}$) 114. The voltage along the measured voltage 113 line can be either the voltage node 106 or a measured voltage from measurement device such as, a current sensor or other similar device that generates $V_{meas}$ from a sensed $I_{meas}$ current. The output of the comparator 116 may then feed directly to the switches 104/105 or there can be some gate driver circuitry 118 that may include, but is not limited to, buffers, delays, and/or logic circuits, to delay or manipulate the control signals to the switches 104 and 105. The coupling between the comparator 116 and/or the gate driver circuitry 118 can also include a timer. In one other version, the timer 120 may have a maximum terminal voltage ($V_{max}$) coupled to the comparison voltage, and/or have a timer input voltage node coupled to the input voltage source 102.

In other examples of the present disclosure, the output of the comparator 116 can be connected to a logic circuit 119. The logic circuit 119 may include, but is not limited to having, a state machine, protection circuitry, voltage or current regulation circuitry, buffers, delays, and/or other logic circuitry to assist in the control of the transistor(s) and/or switch(es) 104/105. The logic circuit 119 can also have an input ($T_{on}$) 161 connected to a timer 120 and/or output 121 for a reset signal. The reset signal may be utilized by the timer. In one version of the present disclosure, the reset signal 121 would correspond to when switch or transistor 105 is turned off or when switch or transistor 104 is turned on. The output of the logic circuit 119 can be coupled to the gate driver circuitry 118. The gate driver circuitry 118 may include individual drivers for individual switches and/or transistors, or may have a single driver for multiple switches and/or transistors. In one version of the present disclosure, the gate driver circuitry 118 can also have a $V_{max}$ input for a $V_{max}$ signal 150 generated by the timer 120. The $V_{max}$ signal 150, in at least one version, is the larger of either the input voltage source 102 or the voltage on voltage node 106.

The timer 120 can generate the corresponding time on ($T_{on}$) or time off signals to an input 161 for a voltage converter, based on the desired operating or operational mode. The timer may utilize a coupling to the input voltage source 102 and the voltage node 106 as inputs. While the output of the timer would be in one version a $T_{off}$ or off time signal or output. The timer 120 may in one version generate a time on signal that corresponds to a time on of a down mode operation.

In at least one version, the control switch 104 is a PMOS or P-type metal-oxide-semiconductor MOSFET transistor, and the control switch 105 is a NMOS or N-type metal-oxide-semiconductor MOSFET transistor. Alternatively, the switches 104 and/or 105 may both be PMOS, NMOS, or a combination of one PMOS and one NMOS transistor.

Figure 2:
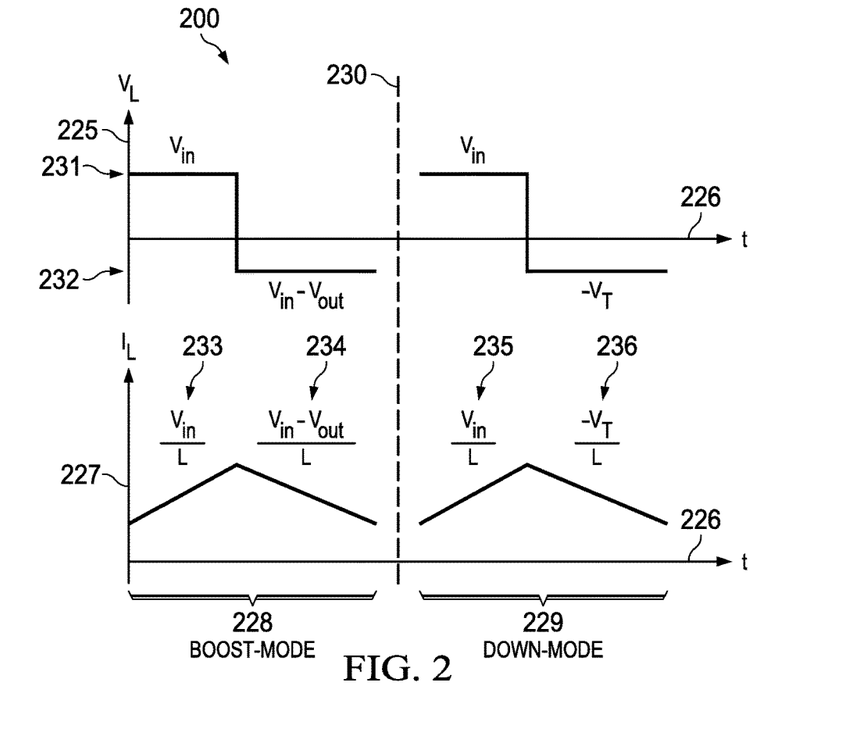
FIG. 2 illustrates graphical timelines of inductor voltage and current

The inductor current and voltage waveforms 200 of the boost converter are illustrated in FIG. 2. For example, these waveforms may result when a control switch 105 is turned on and the inductor is coupled to ground. The voltage across the inductor and the inductor current slope are calculated as shown in equation 1. To discharge the inductor, control switch 105 may be turned off and control switch 104 can by turned on to connect the inductor to the output. The respective inductor voltage and current slopes are calculated as shown in equation 2, across the inductor because $V_{out} > V_{in}$ in a boost converter. During start-up or in applications where the output voltage $V_{out}$ can be smaller than the input voltage ($V_{in}$), the boost converter operates in the so-called down-mode. Down mode operation indicates a steady-state operation of the boost converter with $V_{out} < V_{in}$.

$$V_L = V_{in} > 0, I_L = \frac{V_{in}}{L} > 0. \quad (1)$$

$$V_L = V_{in} - V_{out} < 0, I_L = \frac{V_{in} - V_{out}}{L} < 0, \quad (2)$$

The horizontal or time axis 226 can include a separation indicator 230 to distinguish between a boost mode period 228 and a down mode period 229. The inductor voltage axis 225 illustrates an upper voltage 231, and/or a lower voltage 232. The upper voltage 231 in a boost mode operation can be the input voltage ($V_{in}$), and the lower voltage 232 can be the input voltage ($V_{in}$) minus the output voltage ($V_{out}$). The upper voltage 231 in a down mode operation can be the input voltage ($V_{in}$), and the lower voltage 232 can be the threshold voltage ($V_T$). The inductor current axis 227, illustrates when a boost mode rising current 233, a boost mode falling current 234, a down mode rising current 235, and/or a down mode falling current 236 occur. The boost mode rising current can be characterized as the input voltage ($V_{in}$) divided by the inductor value L. In addition, the boost mode falling current can be characterized as the input voltage ($V_{in}$) minus the output voltage ($V_{out}$) combination divided by the inductor value L. For the down mode, the rising current 235 can be characterized by the input voltage ($V_{in}$) divided by the inductor value L, while the falling current 236 can be characterized by the threshold voltage ($V_T$) of the respective control switch divided by the inductor value L.

In the down-mode the inductor discharge can be done with the gate of control switch 104 coupled to $V_{in}$ carry node. With the gate of control switch 104 coupled to the highest voltage carry node, the transistor stays off and behaves like a passive diode. The inductor current charges the inductor, as soon as control switch 105 is off and control switch 105 starts to become high-impedance. In this case, control switch impedance increases until the threshold voltage ($V_T$) of control switch 104 is exceeded to turn on control switch 104 again. FIG. 2 summarizes the voltage and current waveforms during boost-mode and down-mode. In the down-mode, the control switch voltage may be calculated as a function of an input voltage and a threshold voltage, as shown in equation 3. The resulting inductor voltage, as shown in equation 4, can be a function of a threshold voltage ($V_T$). With the negative voltage across the inductor, the current can be reduced by turning off control switch 104 during down-mode operation with equation 5.

$$V_{sw} = V_{in} + V_T. \quad (3)$$

$$V_L = V_{in} - (V_{in} + V_T) = -V_T < 0. \quad (4)$$

$$I_L = -\frac{V_T}{L} < 0. \quad (5)$$

In general, there are two methods to apply the ideal current measurement of FIG. 1 at the boost converter. First, the measurement can be done across the low-side transistor or control switch 105. The increasing inductor current slope may be measured and the inductor peak current may be compared to the error amplifier output signal. The converter may be within a peak-current-control. Second, the measurement can be done across the high-side transistor or control switch 104. The decreasing inductor current slope can be measured and the inductor valley current can be compared to the error amplifier output signal. The converter can be within a valley-current-control.

Figure 3:
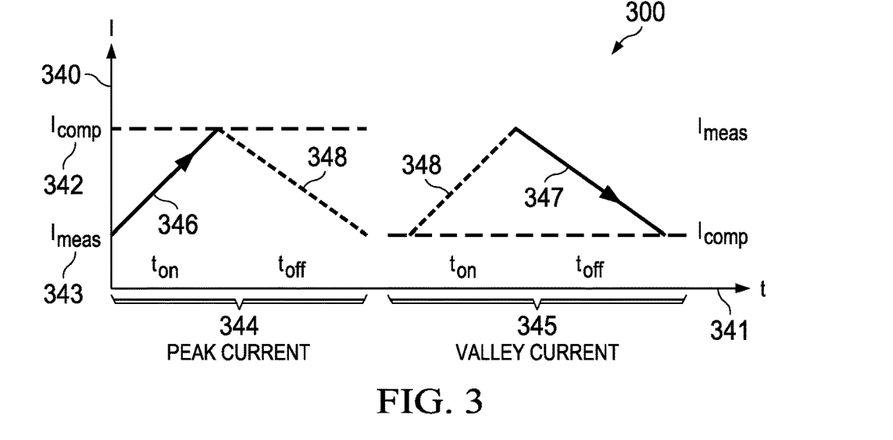
FIG. 3 illustrates peak and valley current waveforms.

FIG. 3 is a waveform illustration 300 for peak and valley currents. The vertical or current axis 340 can be utilized to provide reference to the current valuations or measurements. The horizontal or time axis 341 illustrates a passage of time in relation to the data illustrated or graphed. The vertical or current axis 340 can have an upper current 342 and a lower current 343. The upper current 342 or lower current 343 can be a threshold current value such as a compared current value ($I_{comp}$) or a measured current value ($I_{meas}$). In at least one version, $I_{meas}$ can be sensed or measured at the voltage node 106A of FIG. 1. In other examples, the $I_{meas}$ current could be measured utilizing the voltage across switch or transistor 164 of FIG. 1.

In a peak current mode 344, the time on current value 346 can be $I_{meas}$, with a compared or threshold current of $I_{comp}$ to trigger the time off 348, and/or the generated current slope 348. In a valley current mode 345, the time off current value 347 can be $I_{meas}$, with a compared or threshold current of $I_{comp}$ to end the $I_{meas}$ slope 347. The generated current slope and/or time off 348 can be activated until a specific value or time period may be achieved and then the time off or $I_{meas}$ current slope may be activated.

The input and output voltage ranges of the boost converter determine whether to use a peak-current-control or a valley-current-control. The duty cycle D of the converter can be calculated as a function of both the input and/or output voltages, and may be indicated a time on value, as shown in equation 6.

$$D = \left(\frac{V_{in}}{V_{out}}\right) = t_{on}. \quad (6)$$

The converter on-time ($T_{on}$) defines the time, when the inductor can be charged and control switch 105 can be on. A complete switching period ($T_s$) consists of the on-time $t_{on}$ and the off-time $t_{off} = T_s - T_{on}$, when control switch 104 can be on to discharge the inductor. With a given $V_{in}$ and $V_{out}$ range in each application, the converter control can be either peak- or valley-current-control. When the difference between the maximum input voltage $V_{in}$ and the minimum output voltage $V_{out}$ is large, the on-time $t_{on}$ may be lengthened and peak-current-control can be utilized. When the difference between the maximum input voltage ($V_{in}$) and the minimum output voltage ($V_{out}$) is small, the on-time $t_{on}$ can be short and valley-current-control can be utilized. As soon as the current control method is chosen, the respective part of the switching period, which may not be under active current control, has to be set correctly. In fixed frequency systems, a system clock resets the switching period $T_s$ to restart the converter operation. In quasi-fixed frequency systems, a constant timer signal resets the converter operation. Therefore, peak-current-control converters in quasi-fixed-frequency systems apply for a constant $t_{off}$ timer to generate the missing inductor discharge slope. Valley-current-controlled converters apply for a constant $t_{on}$ timer to generate the missing converter on-time $t_{on}$ or missing inductor charge slope.

Additionally, currents in the inductor can continue to rise, while the transistors are off until at a specific point the current causes a connection across a transistor resulting in a drop in voltage that can be accounted for as $V_T$. This, voltage drop can also cause there to be a voltage drop across the load, generating a further drain on the system and causing there to be even further issues. Because the current across the load cannot be properly compensated for the proper time on cannot be generated by a fixed timer. A fixed timer in the problem illustrated would generate a time on before or after the desired point and likely causing a frequency runaway to occur.

Figure 4:
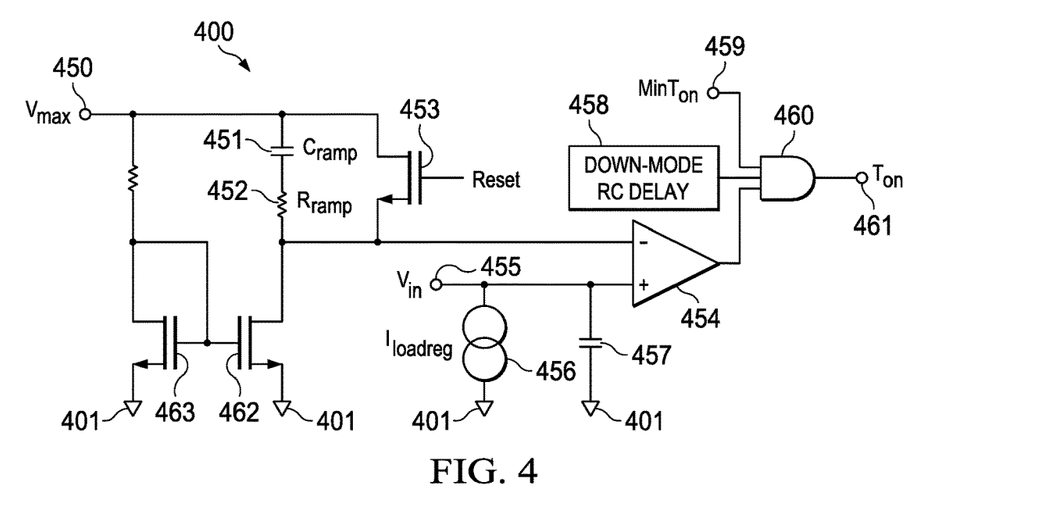
FIG. 4 illustrates a schematic of a boost converter timer circuit.

FIG. 4 is an example of a boost converter timer 400 schematic circuit. As with all circuits, the circuit can be grounded via circuit grounds 401. A max voltage ($V_{max}$) 450 may be connected to a ramp capacitor 451, and/or ramp resistor 452, that can provide a calculated slope value. Additionally, a reset switch 453 can be controlled by a control signal and allow for a bypass of the ramp capacitor 451, and/or ramp resistor 452 from the $V_{max}$ node to a first comparator input. The timer comparator 454 can receive an input from the $V_{max}$ 450 reference side that can include the ramp capacitor 451 and/or ramp resistor 452, and may also include other circuit elements as well. Additionally, the timer comparator 454 can receive at a second comparator input, a timer input voltage ($V_{in}$) 455 that can include a load regulation controlled current source 456, and/or a smoothing capacitor 457, and may also include other circuit elements, such as transistors 462/463. The output of the timer comparator 454 may lead to a digital logic block 460 that can have multiple inputs, such as, a signal from a down-mode RC delay 458, a fixed minimum time on or min $T_{on}$ 459, and/or the output of the timer comparator. The digital logic block 460 can then output a time on value 461 to provide a control signal to a converter.

The goal of a timer is to generate the missing $t_{off}$ when the converter is under $t_{on}$ control (peak-current mode), or to generate the missing $t_{on}$ when the converter is under $t_{off}$ control (valley-current mode). In peak-current-control, the reconstructed duty cycle as shown in equation 7, may be the time off period for a peak-current-control converter. Whereas a valley-current-control may have a time on period, as shown in equation 8.

$$t_{off} = \left(1 - \frac{V_{in}}{V_{out}}\right), \quad (7)$$

$$t_{on} = \left(\frac{V_{in}}{V_{out}}\right). \qquad (8)$$

The capacitor $C_{ramp}$ may be coupled to $V_{max}$. When the timer is activated, the reset switch can be opened and the current $I_C$ proportional to $V_{max}$ discharges $C_{ramp}$ with a given slope. When the voltage $V_C$ hits the input voltage $V_{in}$, the comparator can trigger and the on-time $t_{on}$ duty cycle may be reached. The capacitor equation for the on-time, can be shown in equation 9.

$$I_C \cdot t_{on} = C_{ramp} \cdot \Delta V \qquad (9)$$

$$\Rightarrow t_{on} = \frac{C_{ramp}}{I_C} \cdot (V_{max} - V_{in}).$$

However, the system efficiency and losses across the switches require longer on-times for higher load current. In a real converter, the effective input voltage source ($V_{in}$ charges the inductor and can be a function of the on-resistance of the control switch 105 of FIG. 1 and the DC inductor current $I_L$. In other words, a longer on-time has to overcome the lower effective input voltage to keep the frequency stable. It follows that, as shown in equation 10, the effective on-time $t_{on}$, eff can be higher than $t_{on}$ with increasing inductor current. The timer therefore reduces the input voltage ($V_{in}$) by a current drop across a resistor R with the controlled current circuit $I_{loadreg}$ at the positive input of the comparator.

$$t_{on} = \left(\frac{V_{in}}{V_{out}}\right) \qquad (10)$$

$$\Rightarrow t_{on,eff} = \left(\frac{V'_{in} + R_{DSon,M1} \cdot I_L}{V_{out}}\right).$$

Figure 5:
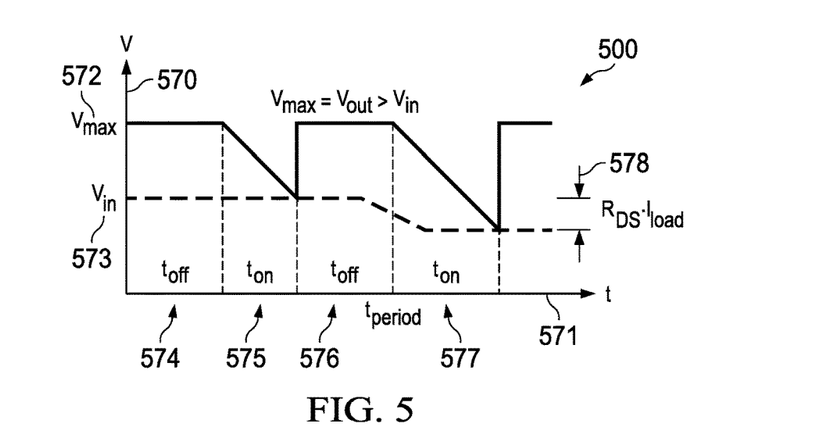
FIG. 5 illustrates a timing diagram for the voltage of a timer.

FIG. 5 is a timing diagram 500 can be illustrated as the input waveforms of the timer comparator 454. The voltage axis 570 can be utilized to illustrate the operational window for the various voltages, such as, an upper voltage ($V_{max}$) 572, or a lower voltage ($V_{in}$) 573. $V_{max}$ can be described as an output voltage ($V_{out}$) greater than the input voltage ($V_{in}$). The horizontal or time axis 571 illustrates the respective time periods for the voltage illustrated by the vertical axis 570.

The first time off or $T_{off}$ section 574 does not match with the second time off ($T_{off}$) section 576, similarly the first time on ($T_{on}$) period 575 does not match with the second time on ($T_{on}$) 577. The time off sections 574 and/or 576 illustrate when the timer comparator can be off, while the time on sections 575 and/or 577 illustrate when the timer comparator can be on in a sampling phase. In at least one version of the present disclosure, the time on section 575 may show the input of the comparator in a no load situation. However, the input values or waveform change when the comparator maybe in a loaded condition such as, in the time off section 576 and/or time on section 577. The threshold voltage drop can be illustrated by 578, wherein the drop may be referenced as the voltage across Resistance DS multiplied by the load current $I_{load}$ or load-current compensation.

Figure 6:
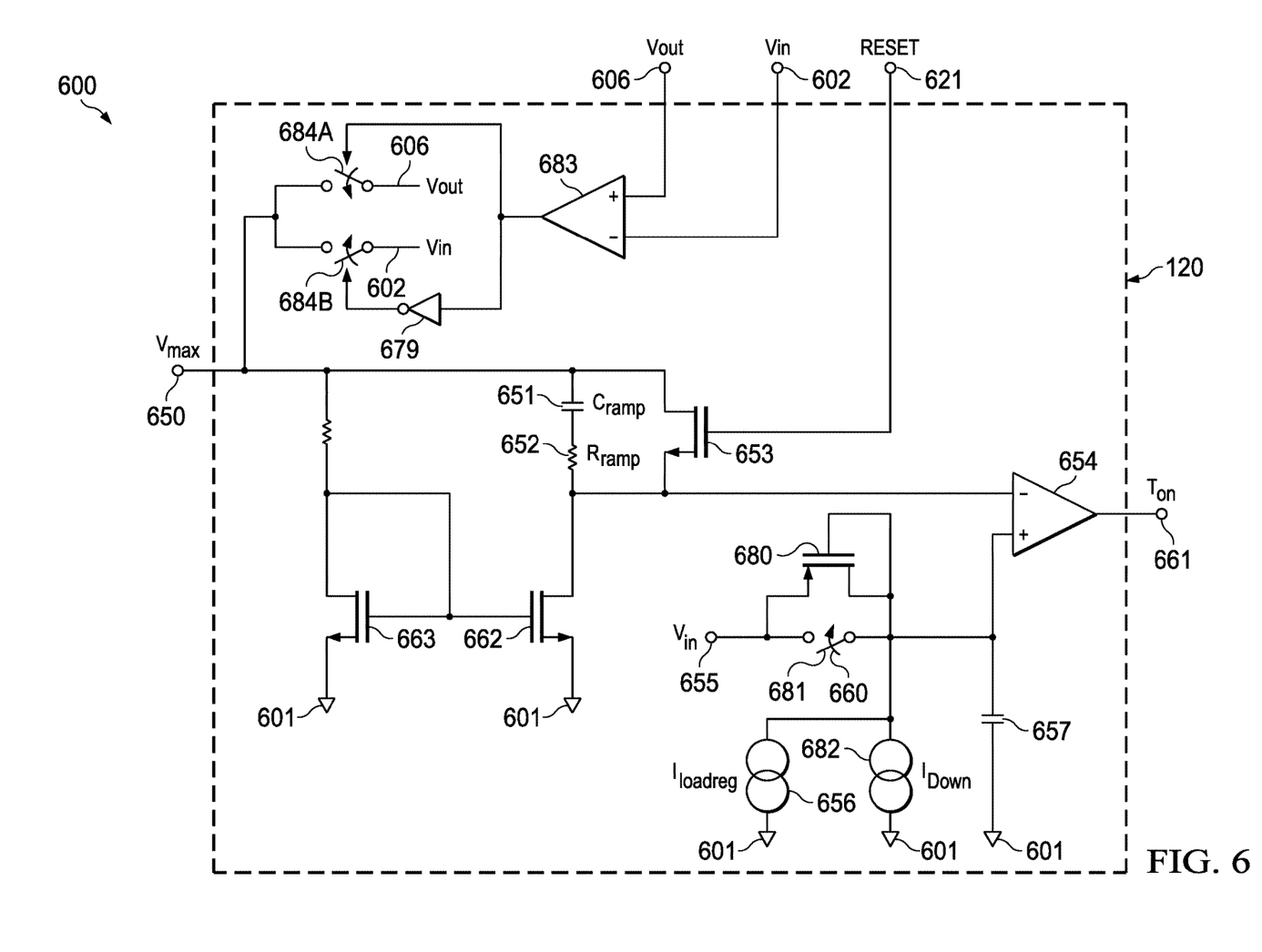
FIG. 6 illustrates a schematic of a timer for use with a boost converter.

FIG. 6 is a schematic illustration of a timer 600 for use with a boost converter. The timer 600 can be implemented into a circuit such as timer 120 in FIG. 1. The timer 600 is coupled to the $V_{in}$ node 602 and $V_{out}$ node 606 of the boost converter. Recall that during boost operation, $V_{out}$ is greater than $V_{in}$. $V_{out}$ node 606 is coupled to the high (non-inverting) side of a first comparator 683 while $V_{in}$ node 602 is coupled to the low (inverting) side of the first comparator. The comparator 683 detects the relative values of $V_{out}$ and $V_{in}$. When $V_{out}$ is greater than $V_{in}$, during boost mode, the comparator produces an output that opens or closes switches 684A and 684B respectively. It is common for a comparator to produce a binary output 1 (or some voltage such as 3V, 3.3V, or 5V) when the high signal is greater than the low signal and a zero (or negative voltage) otherwise. The switches 684A and 684B are also coupled to the $V_{out}$ node 606 and $V_{in}$ node 602. Thus, during boost mode, switch 684A closes, and switch 684B remains open. In this instance, $V_{max}$ is equal to $V_{out}$. When $V_{in}$ is greater than $V_{out}$, during down mode, then the first comparator 683 produces a low signal that passes through an inverter 679. The inverter creates a high signal output for switches 684A/684B causing switch 684B to close, and switch 684A to open. In this instance, $V_{max}$ is equal to $V_{in}$. The comparator 683 and switches 684A and 684B, in at least one version, serve as a voltage selection circuit.

The $V_{max}$ node 650 can be coupled to a ground 601 through resistance, switches, transistors 662/663 or other circuit elements. The transistors 662/663 in at least one version are a current mirror. A ramp capacitor 651 and/or ramp resistance 652 can also be coupled to the maximum voltage node 650. The ramp capacitor 651 and/or ramp resistance 652 can be bypassed by a reset switch 653. The ramp capacitor 651 and/or ramp resistance 652 provide a calculated slope value to a second comparator 654. The reset switch 653 may include a reset signal 621 that may be provided by circuit elements coupled to the converter or from other logic circuits. The output of the ramp capacitor 651 and/or ramp resistance 652 and/or reset switch 653, may be fed to a first input of a second comparator 654, also called a timer comparator.

The second comparator 654 is used to produce the signal needed for a stable $T_{on}$ 661. The low (inverting) side input of the second comparator 654 is selectively coupled to maximum voltage node 650, and the high (non-inverting) side input is selectively through switch 681 is to $V_{in}$ 602 or $V_{in}$ minus the voltage drop across transistor 680. As will be discussed in more detail below, during boost mode, switch 681 is closed, coupling $V_{in}$ to the high side of the second comparator 654. In down mode, switch 681 is open and $V_{in}$ is coupled to transistor 680 producing a voltage drop ($V_T$) or threshold voltage. So, in down mode, a voltage $V_{in}$-$V_T$ is coupled to the high side of the second comparator 654. In boost mode, $V_{max}$ will always be greater than $V_{in}$. More importantly, in down mode, $V_{max}$ will always be greater than $V_{in}$-$V_T$.

In at least one version, the input voltage node 602 can be coupled to a resistance and/or a transistor 680 that can be configured as a diode, and coupled to a switch 681. The switch 681 may have an input 660, configured to control the switch that, in least one version, may be coupled to the output of the comparator 683 or other signals or terminals that can indicate when a voltage converter is in boost or down mode. The transistor 680 may be configured as a diode, and the switch 681 may be closed to bypass the diode configured transistor 680 during a boost mode operation. In a down mode operation, the switch 681 is open, and the current flow through the diode connected transistor 680 generates a $V_t$ voltage drop. The comparator 654 inputs may be directly or indirectly coupled to the input voltage node 602 and/or the maximum voltage node 650.

The transistor 680 and/or switch 681 can be coupled to a load regulation controlled current source 656 and/or a down mode controlled current source 682 or transistor biasing controlled current source, both of which can be coupled to a ground 601. The transistor 680 and/or switch 681 in one version are biased by the load regulation controlled current source 656 and/or the down mode controlled current source 682, to keep the transistor 680 in a saturation region and/or an active region when the switch 681 is open. It should be noted that the transistor 680 and/or the switch 681 can be, but are not limited to, PMOS or p-type metal-oxide-semi-conductor field-effect transistors. In alternative examples the transistors 680 and/or switch 681 can be, but are not limited to, NMOS or n-type metal-oxide-semiconductor field-effect transistors, or a combination of one PMOS and one NMOS transistor.

A smoothing capacitor 657 may also be utilized to provide some stabilization of the signal provided to a second input of the comparator 654. The smoothing capacitor may be coupled on one side to the second input of the comparator 654, transistors 680 and/or 681, the load regulation controlled current source 656, and/or the down mode controlled current source 682, while on the other side the smoothing capacitor 657 can be coupled to ground 601. The output of the comparator 654 may generate the $T_{on}$ signal for the $T_{on}$ node 661 to be provided to a boost converter. The timer illustrated in FIG. 6 can operate in an advantageous way. The operation in boost-mode may be the same as stated above and illustrated in FIGS. 2 and 3. However, in down-mode, an additional diode drop prior to the comparator 654 can be introduced to match the diode voltage drop of the inductor current discharge slope. The diode drop at the positive or second comparator input reduces $V_{in}$ by a $V_T$ voltage drop. It follows that $V_{max}-(V_{in}-V_T)=V_T$, which matches the inductor current discharge, as shown in equation 11, during down-mode. While the capacitor equation in boost-mode can still be a function of the input and/or output voltages as shown in equation 12. Whereas in down-mode, in equation 13, it can be seen that time on may be a function of a threshold voltage.

$$V_L = V_{in} - (V_{in} + V_T) = -V_T < 0, \quad (11)$$

$$I_L = -\frac{V_T}{L} < 0.$$

$$I \cdot t = C \cdot V \quad (12)$$

$$\Rightarrow t_{on,boost} = \frac{C}{I} \cdot (V_{out} - V_{in}),$$

$$I \cdot t = C \cdot V \quad (13)$$

$$\Rightarrow t_{on,down} = \frac{C}{I} \cdot (V_{in} - (V_{in} - V_T))$$

$$\Rightarrow t_{on,down} = \frac{C}{I} \cdot V_T$$

Figure 7A:
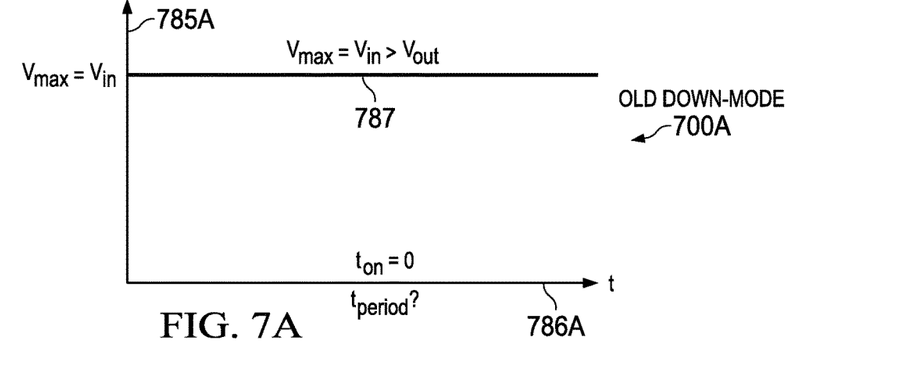
FIG. 7A illustrates the timer voltages an old down mode.
Figure 7B:
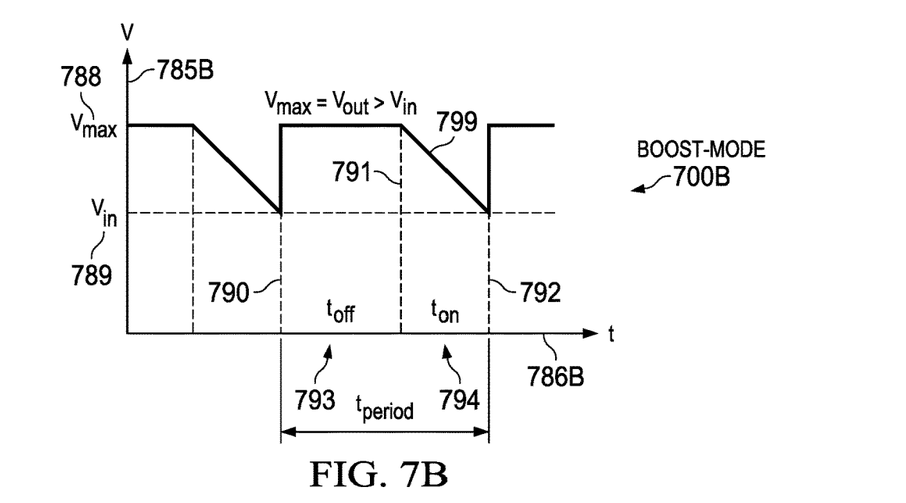
FIG. 7B illustrates the timer voltages in a boost mode.
Figure 7C:
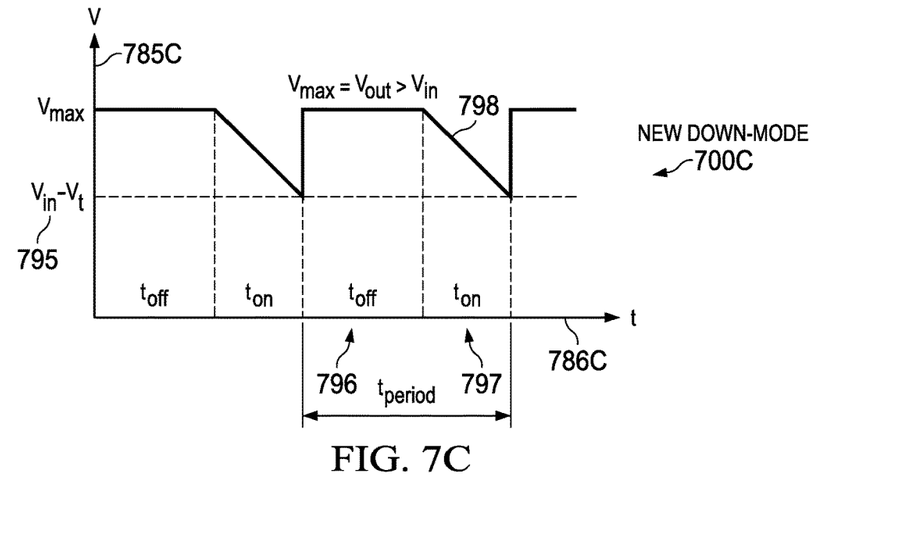
FIG. 7C illustrates the timer voltages a new down mode.

The down-mode on-time $t_{on,down}$ matches the inductor discharge slope and may be able to reconstruct the right frequency. When the converter is driven with higher load currents, the voltage drop across the implemented timer down-mode diode matches the increased voltage drop of the passive high-side power transistor diode. This can be ensured by the load-regulation current $I_{loadreg}$, which may be a function of the output current and taken from the converter error-amplifier. Therefore, a frequency run-away can be avoided. FIGS. 7A, 7B, and 7C summarizes the timer signals in boost-mode and in down-mode.

FIGS. 7A, 7B, and 7C illustrate the timer voltages in various operating conditions such as, old down mode 700A, boost mode 700B, and new down mode 700C. The vertical or voltage axis 785A, 785B, 785C (collectively 785) allows for the indication of various voltage values based on the graphical information. The horizontal or time axis 786A, 786B, 786C (collectively 786) allow for the indication of various action in correlation with the vertical axis 785, that correspond to specific time periods. In the old down mode 700A, the maximum ($V_{max}$) voltage can be equal to the input voltage ($V_{in}$) resulting in a fixed voltage 787. The lack of variation of the $V_{in}$ or $V_{max}$ voltage causes the Time on value to also be fixed as well. Thus, there may be no Time on triggered at any time.

The boost mode 700B, allows for operation where the maximum voltage ($V_{max}$) can be the output voltage ($V_{out}$) when it may be greater than the input voltage ($V_{in}$). The maximum voltage 788, and/or the input voltage ($V_{in}$) 798, are the baseline values for the voltage waveforms 799 during a boost mode operation. The voltage waveform 799 vary between the maximum 788 and/or input voltage 789, when the voltage waveform 799 drops to a specified value such as, the input voltage 789, a time off ($T_{off}$) period 793 begins at the moment in time indicated by broken line 790. The time off period 793 may be best described in a boost mode 700B as the time period when the timer voltage may be at maximum voltage. The time on ($T_{on}$) period 794 can be best described as the period triggered at a point in time 791 illustrated by a broken line, the voltage waveform 799 drops at a specified time or triggered event. The voltage waveform 799 will continue to drop until it drops to a specified value or trigger event, such as, a trigger point (broken line 792) that would allow for the time off period to begin.

The down mode operation 700C, can be best described as the operational period when the maximum voltage ($V_{max}$) can be equal to an input voltage ($V_{in}$) greater than the output voltage ($V_{out}$). The lower voltage 795 can be best described as the input voltage ($V_{in}$), minus a threshold voltage ($V_T$). The down mode voltage waveform 798 can vary between the maximum voltage and the lower voltage 795. The down mode time off period 796 can be when the down mode voltage waveform 798 corresponds with the maximum voltage for a period time, or until a specific event triggers a change in the down mode voltage waveform. When a change may be triggered or time period expires, the down mode voltage waveform 798 enters a down mode time on period 797. The down mode time on period 797, can be described as when the down mode voltage waveform 798 drops from a maximum voltage to the lower voltage 795 based on a specific time period or triggering event. The down mode voltage waveform 798 can drop to specific value, such as the lower voltage 795 which can be the input voltage ($V_{in}$) minus the threshold voltage ($V_T$).

Figure 7D:
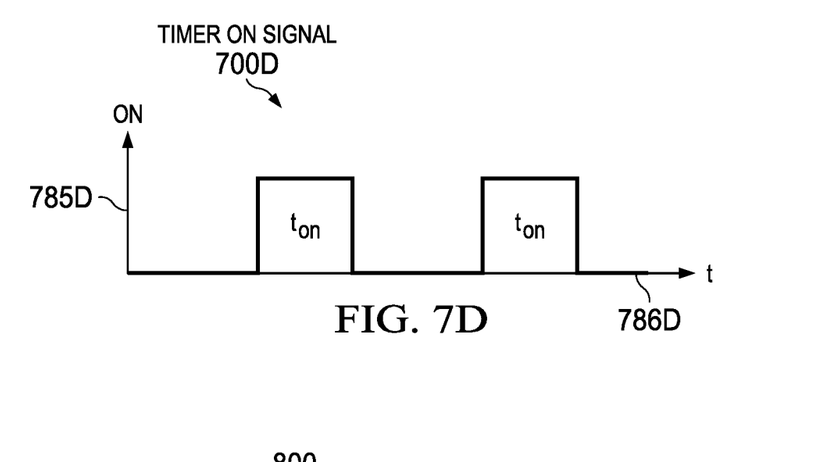
FIG. 7D illustrates a timer signal.

FIG. 7D illustrates a timer signal 700D. The timer signal 700D can include time on ($T_{on}$) 797, or time off ($T_{on}$) 796 periods. The timer signal strength can be seen in references to the vertical axis or timer signal axis 785D, and the horizontal or time axis 786D. These high and low periods also correspond to the $T_{on}$ 797 and $T_{off}$ 796 of FIGS. 7A, 7B, and 7C.

Figure 8:
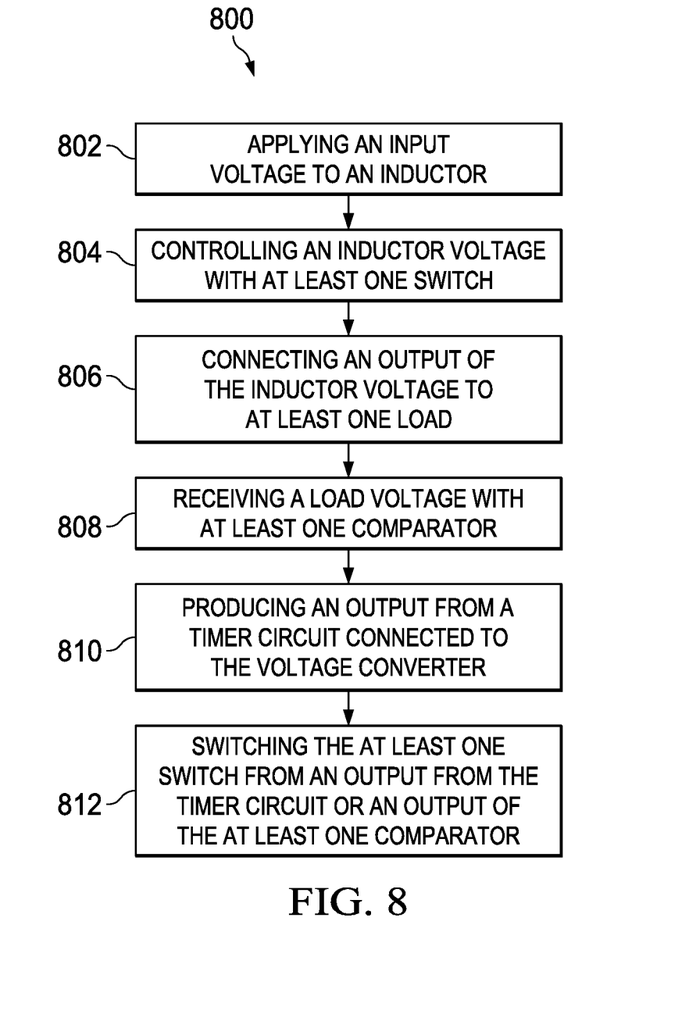
FIG. 8 illustrates a method of operating a boost converter with a quasi-fixed timer.

FIG. 8 illustrates a method of operating a boost converter with a quasi-fixed timer 800. Step 802 illustrates applying an input voltage to an inductor or an inductor input node. A DC to DC boost converter will rely on an inductor that can be charged and discharged to generate the voltage boost for a load. The load may be resistive, capacitive, or inductive. Step 804, illustrates controlling an inductor voltage with at least one switch. To charge and discharge the inductor a switch may be utilized. Step 806, illustrates connecting an output of the inductor voltage, or an output voltage node or output node, to at least one load. The inductor voltage may be coupled to an at least one load via the at least one switch controlling the inductor voltage. In an inductor charging, the at least one switch may be coupled to ground, or through other circuit elements to a ground. To discharge the inductor at least one switch may be decoupled from a ground or coupled to the load and/or a smoothing or charging capacitor to generate a load voltage. Step 808, illustrates receiving a load voltage with at least one amplifier input. An amplifier and/or comparator can be utilized as part of the control, or control circuitry to ensure that the load voltage may be maintained within a set or given value, or may be responsive to varying load conditions. The input to the amplifier may also be fed through feedback resistor, a voltage divider, and/or a trimable resistor in order to create a voltage level that can be compared. Step 810 illustrates producing an output from a timer circuit coupled to the voltage converter. A timer may be utilized to control the at least one switch of the converter. The timer may also include a plurality of voltage inputs, resistors, capacitors, and/or other circuit elements. In one version, the timer may have a sensed or measured voltage input, and/or a reference voltage input.

In another example, the time may include a voltage selection or maximum voltage circuit. The maximum voltage circuit may include an input voltage and an output voltage from the voltage converter at a input voltage node and an output voltage node, at least two switches coupled to the input voltage and the output voltage nodes respectively, and/or a comparator or a first comparator for comparing the input and output voltages. The at least two switches can be controlled by the output of the comparator, to produce a maximum voltage, at a maximum voltage node or terminal of the timer.

For example, a comparison voltage may be utilized as a reference voltage for the timer, and a sensed or measured voltage maybe measured or sensed before or after the at least one switch of the converter. Step 812 illustrates operating or switching the at least one switch from an output from the timer circuit or an output of the at least one comparator. In other examples, the output signal of a timer or the output signal of a comparator may be utilized to control the at least one switch of the converter. The output signal of a timer may be a time on signal. The switching can be controlled in a manner that maintains the converter in a specified operating state such as, boost mode, down mode, peak control, or valley control.

Figure 9:
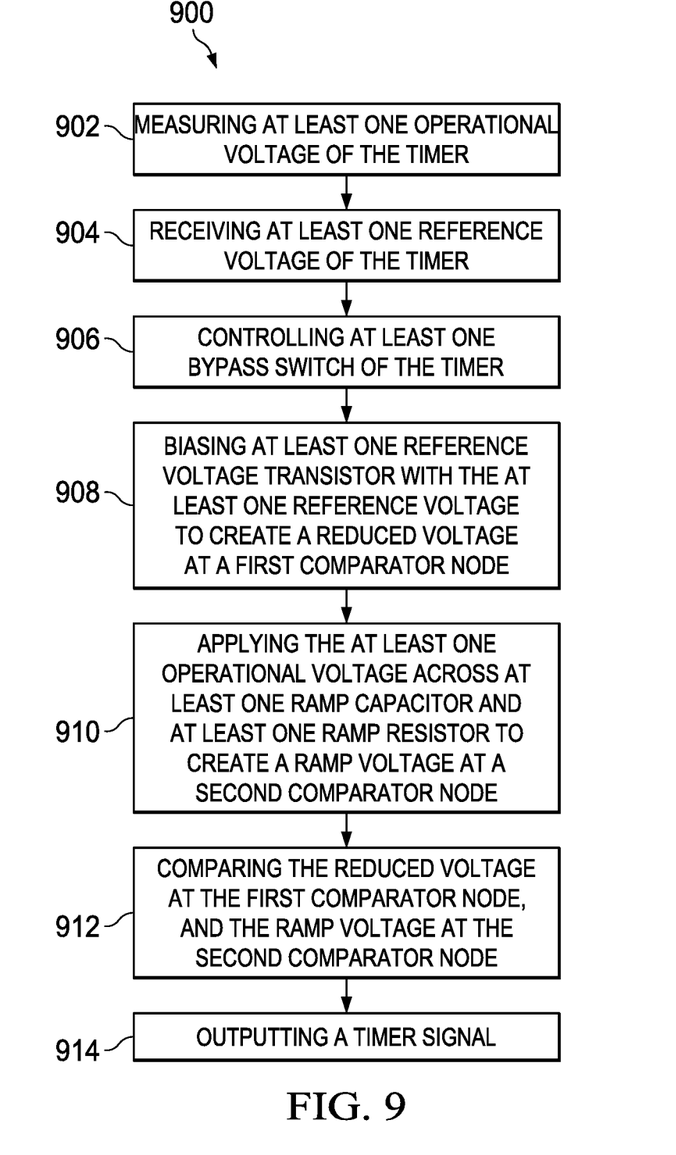
FIG. 9 illustrates a method of operating a quasi-fixed timer.

FIG. 9 illustrates a method of operating a quasi-fixed timer 900. Step 902 illustrates measuring at least one operational voltage of the timer. An operational voltage may be measured or sensed, and in one version of the present disclosure may be measured before or after at least one controlling switch. The measured voltage may also be considered a measured or sensed voltage. Step 904 illustrates receiving at least one reference voltage of the timer. A reference voltage input of the timer may be a voltage provided from a converter, and/or other circuit element. In other examples, the reference voltage may be a comparison voltage generated from a converter via a comparator. The converter comparator may generate the comparison voltage based on inputs from a load voltage and a fixed or varying reference load voltage. Step 906 illustrates controlling at least one bypass switch of the timer. The bypass switch may also be a reset switch, the reset switch can be controlled with a reset signal received at a reset terminal. The reference voltage may have various circuit elements or components connected to it, include a ramp capacitor, a ramp resistor, which can be in parallel with at least one reset switch. The at least one reset switch may be controlled by a signal from the timer circuit or from a signal generated from the converter. The reset switch may be utilized to generate a direct path for the reference voltage to a timer comparator.

Step 908 illustrates biasing at least one measured or sensed voltage transistor with the at least one measured or sensed voltage to create a reduced voltage at a first comparator node. To ensure stable operation of the timer at least one transistor may be introduced between the measured or sensed voltage input and the timer comparator. The at least one transistor may be two transistors coupled to form a diode, such as, a PMOS diode. Alternatively, the measure or sense voltage will be an input voltage of a converter, and the at least one transistor will be two transistors, one connected in a diode configuration, and the other as a bypass switch. When in boost mode the diode configured transistor is bypassed to prevent a change of the boost mode voltage, but in down mode the input voltage, and a corresponding current flows through the diode configured transistor to generated a voltage drop. The at least one transistor creates a voltage drop from the measured or sensed voltage to allow for a voltage difference to be present when compared by the timer comparator with the reference voltage. The voltage drop may result in a reduced voltage that may be seen at the comparator input. Step 910 illustrates applying the at least one operational voltage across at least one ramp capacitor and at least one ramp resistor to create a ramp voltage at a second comparator node. The at least one ramp capacitor and the at least one ramp resistor can be utilized to create fixed slope values for comparison by the timer comparator. The slope values, in other examples of the present disclosure, may match the desired waveforms or voltage or current levels desired for the converter. Step 912 illustrates comparing the reduced voltage at the first comparator node, and the ramp voltage at the second comparator node. The timer comparator may be utilized to compare the reference voltage and the measured or sensed voltage. Either of the reference voltage, and the measured or sensed voltage may also be modified by circuit elements or components prior to the comparator. The reference voltage and the measured or sensed voltage, may not be the exact voltages compared by the comparator as various circuit components or elements may cause variations or losses of the signal and/or signal strength. Step 914 illustrates outputting a timer signal. The output of the timer comparator can be a control signal that can be utilized to control switches of the converter. The output of timer comparator may be modified or compared with other additional timer or digital logic circuits with multiple inputs and outputs. However, it should be noted that in other examples of the present disclosure the timer output signal can be sent directly to the control elements of a converter. The timer may be implemented in a standalone chip or as part of a voltage converter chip, and may include additional inputs, outputs, or terminals to incorporate additional circuit components or controls.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

We claim:

1. A timer, comprising:
a first comparator with a first input coupled to a first node to receive a first voltage, and a second input coupled to a second node to receive a second voltage of a boost converter having a boost mode and a down mode;
a voltage selection circuit coupled to an output of the first comparator and to the first node and the second node, wherein the voltage selection circuit is configured to select a higher one of the first voltage or the second voltage at a third node; and
a second comparator having a first input and a second input, the first input coupled to the third node, and the second input is selectively coupled to the second node.

2. The timer of claim 1 wherein the voltage selection circuit comprises:
a first switch coupled between the output of the first comparator and the first node; and
a second switch coupled between the second node and the output of the first comparator through an inverter.

3. The timer of claim 1 wherein the output of the voltage selection circuit is coupled to a current mirror.

4. The timer of claim 1, the output of the voltage selection circuit coupled to a ramp resistor.

5. The timer of claim 3, wherein the current mirror includes a first transistor and a second transistor.

6. The timer of claim 1, the output of the second comparator includes a time on signal.

7. The timer of claim 1, includes a load regulation controlled current source coupled to the second input of the second comparator.

8. The timer of claim 1 wherein the voltage selection circuit includes a down mode controlled current source coupled to the second input of the second comparator.

9. A system, comprising:
a boost converter; and
a timer coupled to the boost converter, the timer comprising:
a first comparator with a first input coupled to a first node to receive a first voltage, and a second input coupled to a second node to receive a second voltage of the boost converter;
a voltage selection circuit coupled to an output of the first comparator and to the first node and the second node, wherein the voltage selection circuit configured to select a higher one of the first voltage or the second voltage at a third node; and
a second comparator having a first input and a second input, the first input coupled to the third node, and the second input selectively coupled to the second node.

10. The system of claim 9, wherein the boost converter having a boost mode and a down mode.

11. The system of claim 9, wherein the transistor is a PMOS transistor coupled in a diode configuration that allows for a voltage drop during a down mode of the boost converter between the second node and the second input of the second comparator.

12. The system of claim 9, includes a load regulation controlled current source coupled to the second input of the second comparator.

13. The system of claim 9, includes a down mode controlled current source coupled to the second input of the second comparator.

* * * * *